United States Patent [19]

Wolf et al.

[11] 4,253,496

[45] Mar. 3, 1981

[54] HEAVY DUTY POWER VALVE

[75] Inventors: Peter Wolf, Baroda; Kenneth L. Williams, Coloma, both of Mich.

[73] Assignee: Lambert Brake Corporation, St. Joseph, Mich.

[21] Appl. No.: 100,147

[22] Filed: Dec. 4, 1979

Related U.S. Application Data

[63] Continuation of Ser. No. 858,263, Dec. 7, 1977, abandoned.

[51] Int. Cl.$^3$ .............................................. F16K 1/02
[52] U.S. Cl. ..................................... 137/862; 60/548; 137/596.12
[58] Field of Search ............... 60/548, 554, 591, 581, 60/547 R; 251/333, 337, 77, 79, 80, DIG. 4, 319, 320, 321, 322; 137/862, 871, 596.12

[56] References Cited

U.S. PATENT DOCUMENTS

| 3,761,053 | 9/1973 | Bedo | 251/DIG. 4 |
|---|---|---|---|
| 3,787,029 | 1/1974 | Shellhause | 251/333 |
| 3,808,817 | 5/1974 | Bennett | 60/548 |
| 3,827,765 | 8/1974 | Husted | |
| 3,900,229 | 8/1975 | Husted | 60/550 |
| 4,106,170 | 8/1978 | Schoeneweis | 251/77 |
| 4,141,284 | 2/1979 | Wolf | 60/548 |
| 4,154,326 | 5/1979 | Wolf | 60/548 |

*Primary Examiner*—Abraham Hershkovitz
*Attorney, Agent, or Firm*—Trexler, Wolters, Bushnell & Fosse, Ltd.

[57] ABSTRACT

A brake valve is disclosed, which is provided with an enlarged chamber, at one end of which is slidably disposed an annular piston. A reaction piston is carried on a valve rod; the reaction piston radially extends so as to cover the annular piston. When the reaction piston moves toward the annular piston, flow of fluid through the valve is restricted and then halted. Mating beveled conical surfaces are provided on the annular piston and the reaction piston to provide a mutual centering and seating action as the reaction piston is moved toward the annular piston. Belleville washer elements are stacked in opposed array on the valve rod for resiliently urging the reaction piston into engagement with the annular piston, and for inhibiting mechanical shocks from being transmitted from the valve rod to the reaction piston, and vice versa. Conical fluid flow stop members regulate the flow of fluid from the valve chamber to downstream brake elements. These fluid flow stop members are slidable into and out of engagement with respective annular seats; directional braking action is afforded by these stop members, such that one or both of the brake elements are pressurized from the valve chamber.

8 Claims, 7 Drawing Figures

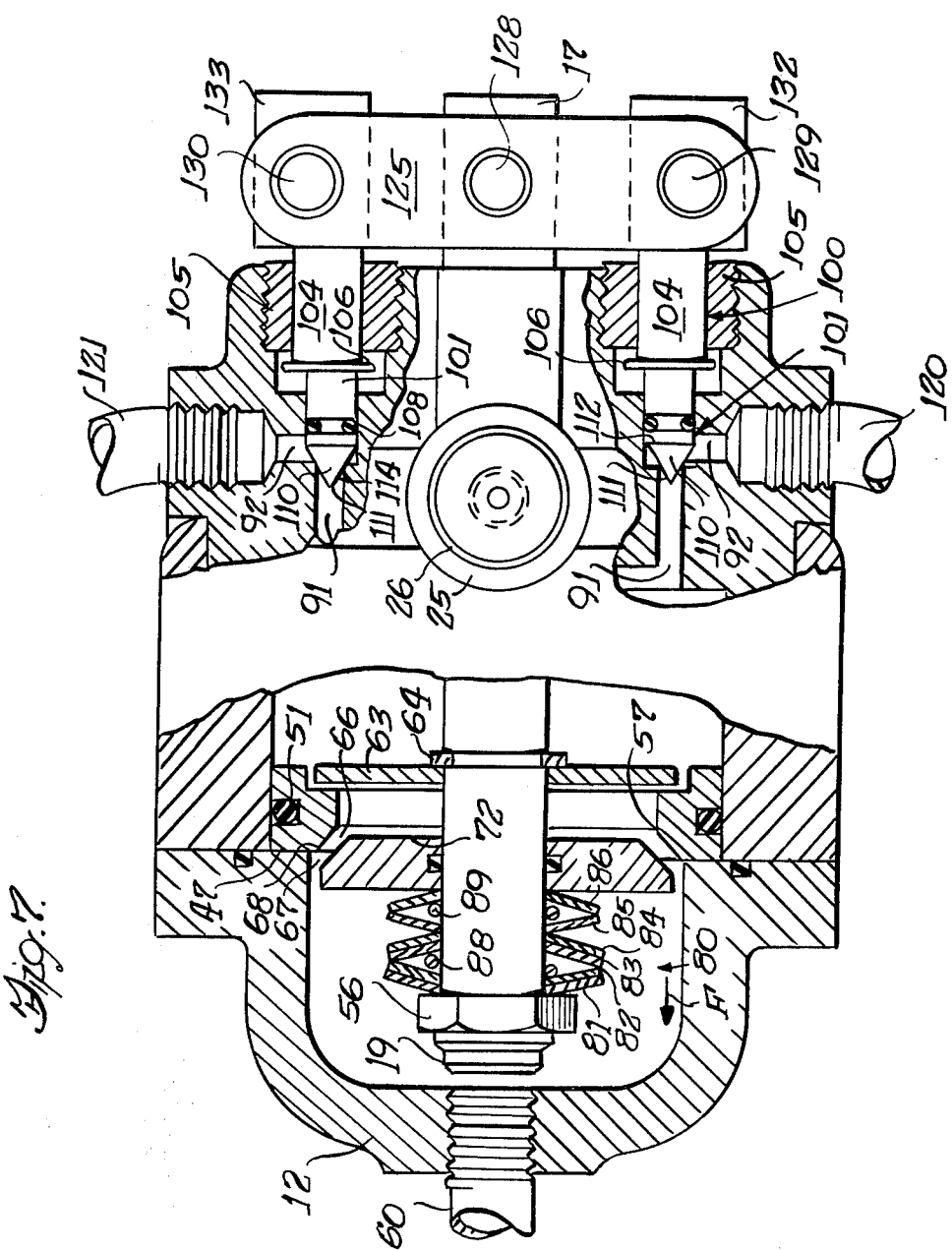

HEAVY DUTY POWER VALVE

BACKGROUND OF THE INVENTION

This is a continuation of application Ser. No. 858,263, filed Dec. 7, 1977 now abandoned.

This invention relates generally to hydraulic system controls, and more particularly concerns a control valve for use with a braking system.

Hydraulic brake systems of the types used in tractors and similar vehicles require brake actuators having good pressure modulation capability, good reliability, and good serviceability. Until recently, these brake actuators have been of the spool-type variety. These valves operated well, but some types provided less than perfect pressure modulation with variations of fluid flow within the brake system.

To overcome these difficulties, a single pull rod valve having excellent modulation charactertistics has been offered for use in low or medium pressure, open or closed center hydraulic systems. The valve provides both power and manual mode functions.

It is a general object of the present invention to provide a valve of the pull-rod type which is especially adapted for extended use in systems where the valve is often actuated and is otherwise heavily used.

A more specific object is to provide a valve of the general type described which inhibits or completely eliminates internal leakage, i.e., which inhibits or completely eliminates the leakage of hydraulic or brake system fluid between parts carried within the valve housing.

Another object is to provide such a valve in which the leakage characteristics increase little if any during extended periods of heavy valve use.

Yet another object is to provide a valve of the general type described having increased and improved resistance to internal valve damage caused by system operation.

A further object is to provide a valve of the general type described in which internal parts are protected from possible damage by mechanical shocks.

A related object is to provide such a valve in which various internal valve parts engage one another gradually and with self-centering action.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 7 is a top plan view of another version of the valve embodying the present invention, portions of the valve housing adjacent an exhaust port and left and right brake ports being broken away to show internal portions of the valve mechanism in further detail.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included in the spirit and scope of the invention as defined by the appended claims.

Figure 1:
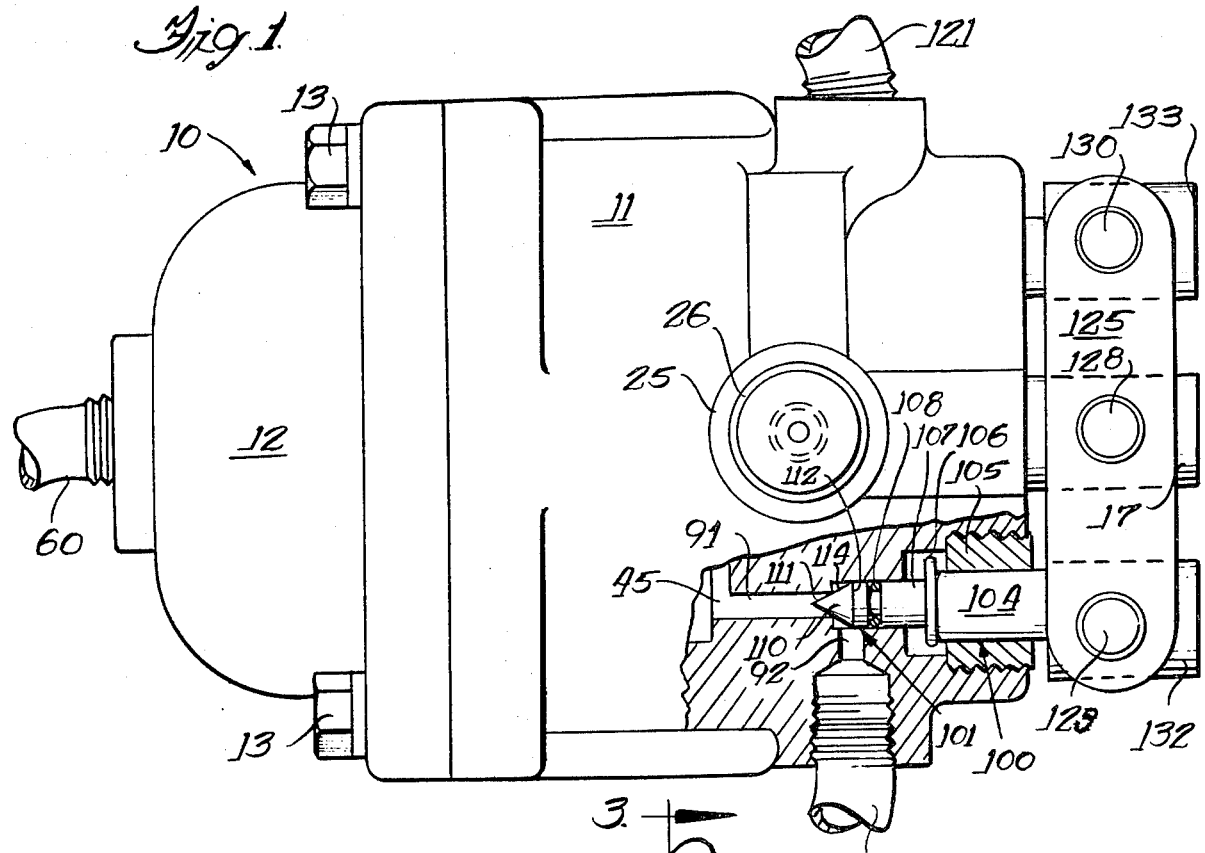
FIG. 1 is a top plan view of a valve embodying the present invention, portions of the valve being broken away to show the arrangement of internal valve parts more clearly.
Figure 6:
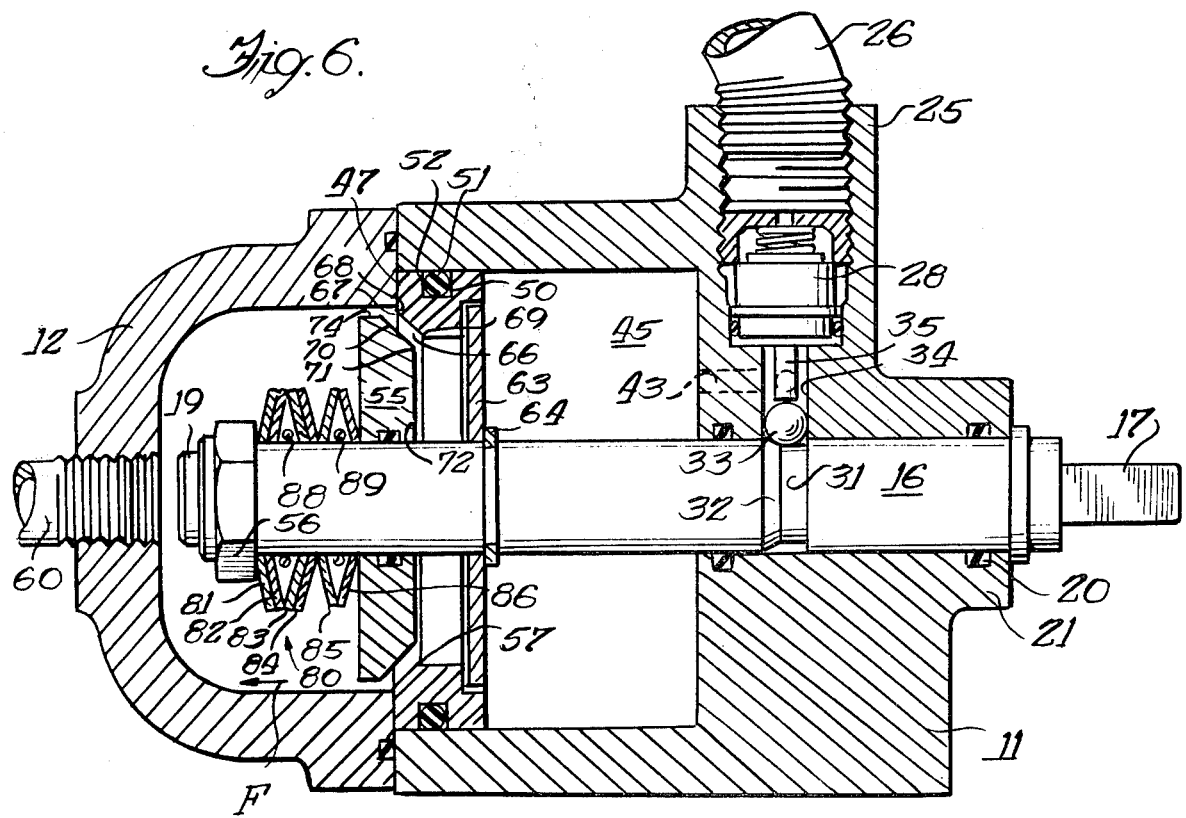
FIG. 6 is a sectional view similar to FIG. 3 of the modified embodiment of the valve taken substantially in the plane of line 6—6 in FIG. 5.

Turning first to FIGS. 1 and 6, there is shown a valve 10 embodying the present invention. This valve can be considered to be defined by a housing member 11 to which a cap 12 is secured by bolts 13. A bi-ended valve actuator rod 16 has a first end 17 located outside the valve housing 11 for connection to valve actuator linkage, as will be described below. A second rod end 19 is carried within the valve. The rod 16 is disposed so as to slide at least partially into and out of the housing member 11. To prevent fluid leakage between the rod 16 and housing 11, a seal 20 can be mounted in an extension 21 of the housing member 11.

This valve 10 can be used with closed-center braking systems, in which hydraulic pressure is supplied to the system by a closed-center variable displacement pressure compensated radial piston pump of the type available from Deere & Company, Moline, Ill. Briefly, in these systems, the pump (not shown here) draws fluid from a reservoir, and provides a constant fluid pressure; the rate of fluid flow through the system can vary from nil to whatever amount may be necessary to operate system mechanisms. To receive this pump-generated pressure, the valve housing 11 defines an inlet port 25, which is here shown connected to a hose 26 which provides a fluid conduit from the pump (not shown). Within the inlet port 25 is located a normally closed check valve 28.

Figure 2:
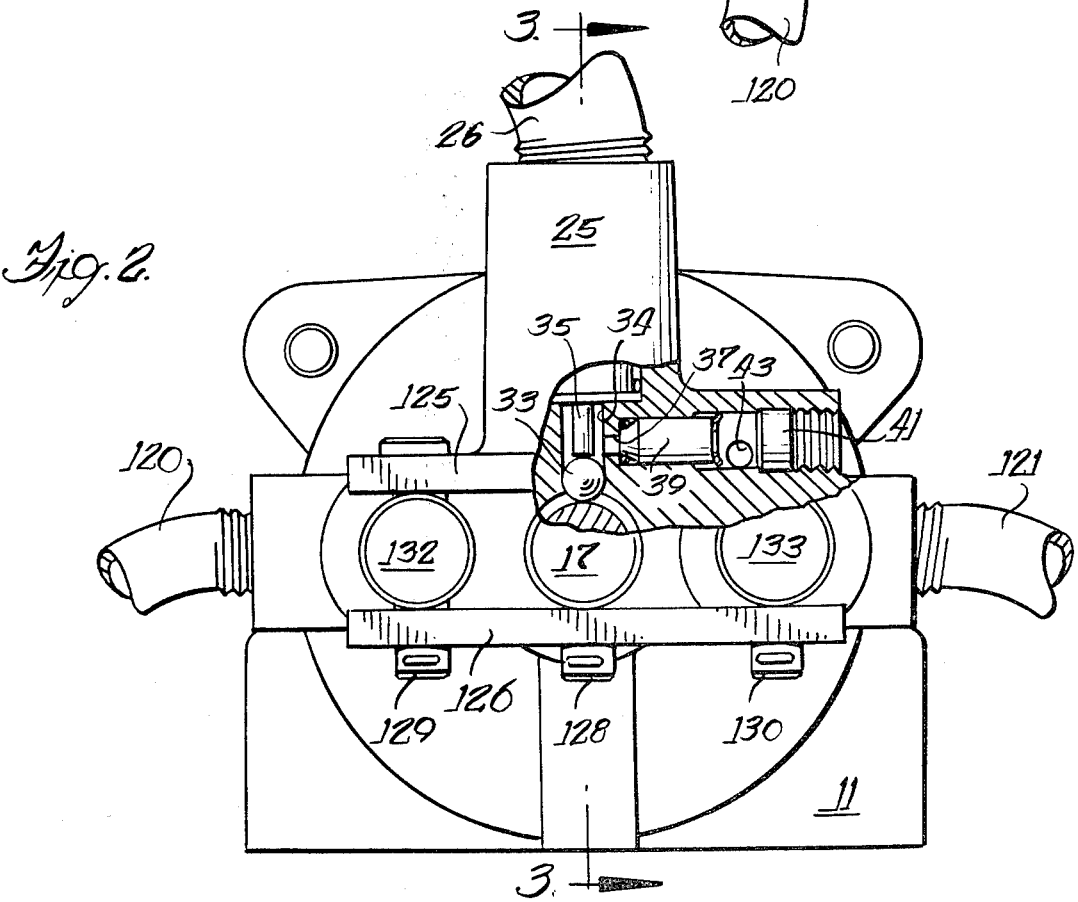
FIG. 2 is an end elevational view of the valve shown in FIG. 1, portions of the valve housing again being broken away to show in further detail internal portions of the valve parts.

It will be further understood that when the valve 10 is used in a closed-center brake system, fluid is admitted to the valve 10 only when braking action is desired. When the vehicle or system operator actuates connector links (not fully shown) attached to the valve rod outer or first end 17, the rod 16 is moved to the right as shown in FIGS. 1, 3, 4 and 6. A rod recess 31 is, of course, also moved (to the right) so as to bring a conical actuator cam surface 32 into engagement with an actuator ball 33 carried in a housing well 34, and to force that ball 33 upwardly. Radially outward or upward motion of the ball 33 causes the ball 33 to engage and then move upward and interconnector pin 35 to cause opening action in the check valve 28. When the check valve 28 is opened, fluid flows in a downstream direction through the check valve 28, and into the well 34. An intercepting bore 37 (FIG. 2) leads fluid from the well 34 through a second or downstream check valve 39 which is so constructed so as to permit fluid to flow only in that downstream direction. A plug 41 prevents fluid discharge from the bore 37.

Figure 3:
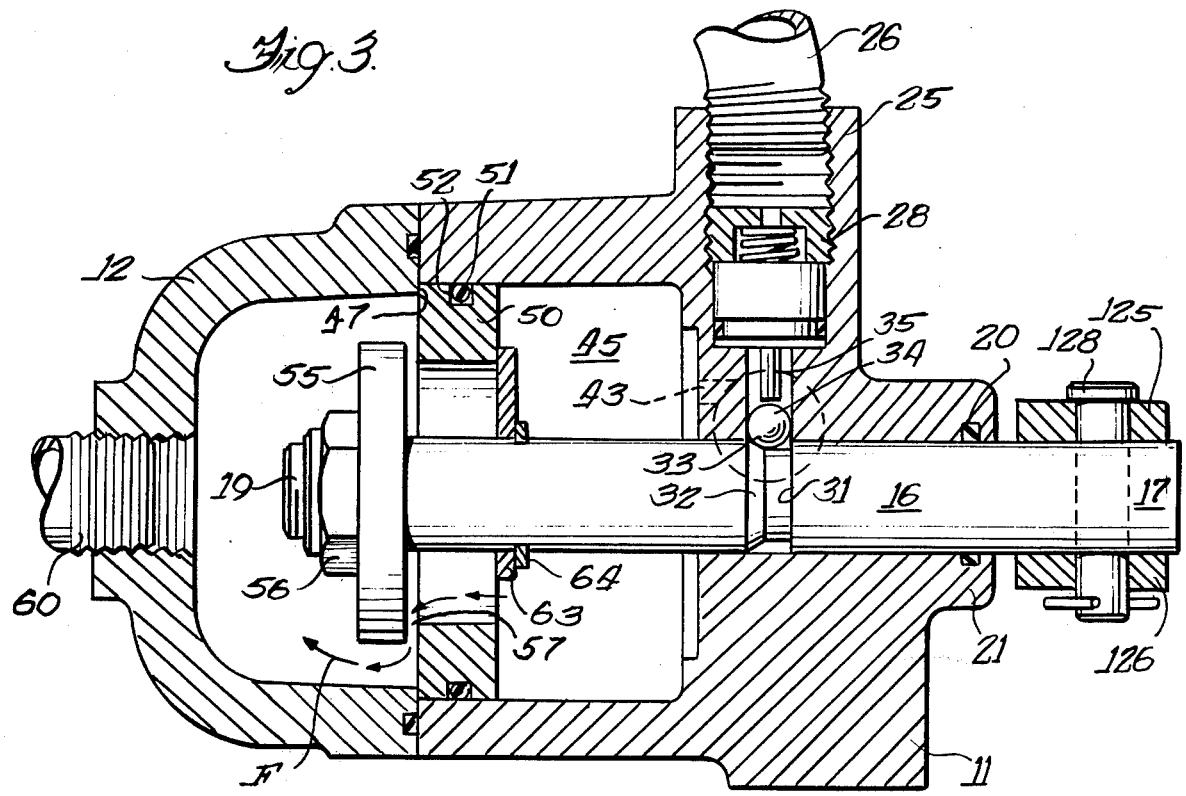
FIG. 3 is a sectional view taken substantially in the plane of line 3—3 in FIG. 2.

Again the fluid is directed to an intercepting bore, at this time a bore 43 (FIGS. 2 and 3) leading from the downstream check valve 39 and bore 37 to a relatively large operating chamber 45 (FIGS. 3 and 6). It will be noted that the valve cap 12 is provided with an interior recess or bore having a diameter slightly less than the bore of the valve chamber 45 formed in the main housing member 11. Against an annular step 47 thus created between the cap 12 and the housing 11 rests an annular or apertured piston 50, through which the valve rod 16 extends. An O-ring seal member 51 carried in a recess 52 in the annular piston 50 prevents fluid leakage around the piston outer perimeter.

It will be noted that the valve rod mounts, at its interior or second end 19, a reaction piston 55, as by a securing nut 56 or other suitable structure. When the valve rod 16 and the reaction piston 55 are located as illustrated in FIGS. 3 and 6, fluid is permitted to flow from the chamber 45 through the annular flow space 57 formed in the annular piston 50, around the reaction piston 55, and out a return or exhaust port 60 formed and carried by the valve cap 12, as illustrated by the arrow F. An apertured keeper spider 63, help upon the valve rod 16 by a snap ring 64, keeps the apertured piston 50 and valve rod 16 within a limited range of axial positions relative to one another.

It will be understood, however, that when the valve 10 is to be used with a closed-center braking system, the first check valve 28 will be provided, and, consequently, little or no fluid flow will ordinarily occur along the flow path F. If, however, the valve 10 is used with an open-center system, fluid normally flows through the valve, along the path F when the system brakes are not energized and the valve parts are positioned as shown. In such an open-center system, the first check valve 28 is not provided.

To halt fluid flow along the path F and to provide an effective seal between the reaction piston 55 and the annular piston in accordance with one aspect of the invention, these two pistons 50 and 55 are provided with making beveled surfaces as shown in the embodiment of FIG. 6. More specifically, the annular piston 50 is provided with an interior beveled surface 66 which, for ease in manufacturing, takes the form of a truncated cone having its large diameter 67 located on the annular piston face 68 adjacent the reaction piston 55. This beveled surface 66 tapers smoothly to a small diameter 69 located at a point axially upstream of the piston face 68. A mating beveled edge 70 is formed on the reaction piston 55; this surface 70 also takes the form of a truncated cone, and tapers smoothly from a small diameter 71 (formed on the face 72 of the reaction piston 55 which is adjacent the annular piston 50) to a large diameter 74 located at a point axially downstream of that reaction piston face 72. A feature of the invention is that these mating beveled faces provide a mutual centering and inter-engaging seating action to the annular piston 50 and the reaction piston 55 as the reaction piston 55 is moved toward the annular piston 50. Sudden piston inter-engagement is thus avoided, the halting of fluid flow through the fluid flow space 57 is reduced to a more gradual action, brake action is smoothed, internal brake fluid leakage is eliminated or reduced, and the effects of valve part wear are minimized even after the valve has been used for a long period of time.

To reduce or eliminate mechanical shocks to internal valve parts in accordance with another aspect of the invention, the embodiment shown in FIG. 6 is provided with an interior or second valve rod end 19 located at an extended axial distance from the reaction piston 55. Between the retainer nut 56 and the piston 55 itself, a resilient assembly 80 is carried upon the rod 16. Here, this resilient assembly 80 takes the form of a plurality of Belleville washer elements 81–86. At least some of the Belleville washer elements (here elements 82 and 83) are stacked upon the rod 16 in opposed relationship, as illustrated particularly in FIG. 6, so as to provide a resilient, spring-like effect to the washer stack 81–86 as the retainer 56 is drawn toward the reaction piston 55. These Belleville washers 81–86 provide the requisite resilient spring action when even limited motion occurs between the piston retainer 56 and the reaction piston 55, yet they are reliable and rugged in use and provide a long service life.

In carrying out the invention, spacer elements 88 and 89 are carried on the rod 16 as illustrated in FIG. 6 so as to prevent the rod and rod retainer nut 56 from compressing the Belleville washers 81–86 beyond desired stress levels, so that the life span of the Belleville washers will be increased, thereby maintaining the desired resilient spring action.

When the reaction piston 55 is drawn toward and against the annular piston 50, the chamber 45 is closed, as explained above. As increments of fluid are delivered to the valve, the pressure in the chamber 45 rises, and a fluid and fluid pressure discharge occurs from the valve to operate brake units or other brake system elements (not shown).

Figure 4:
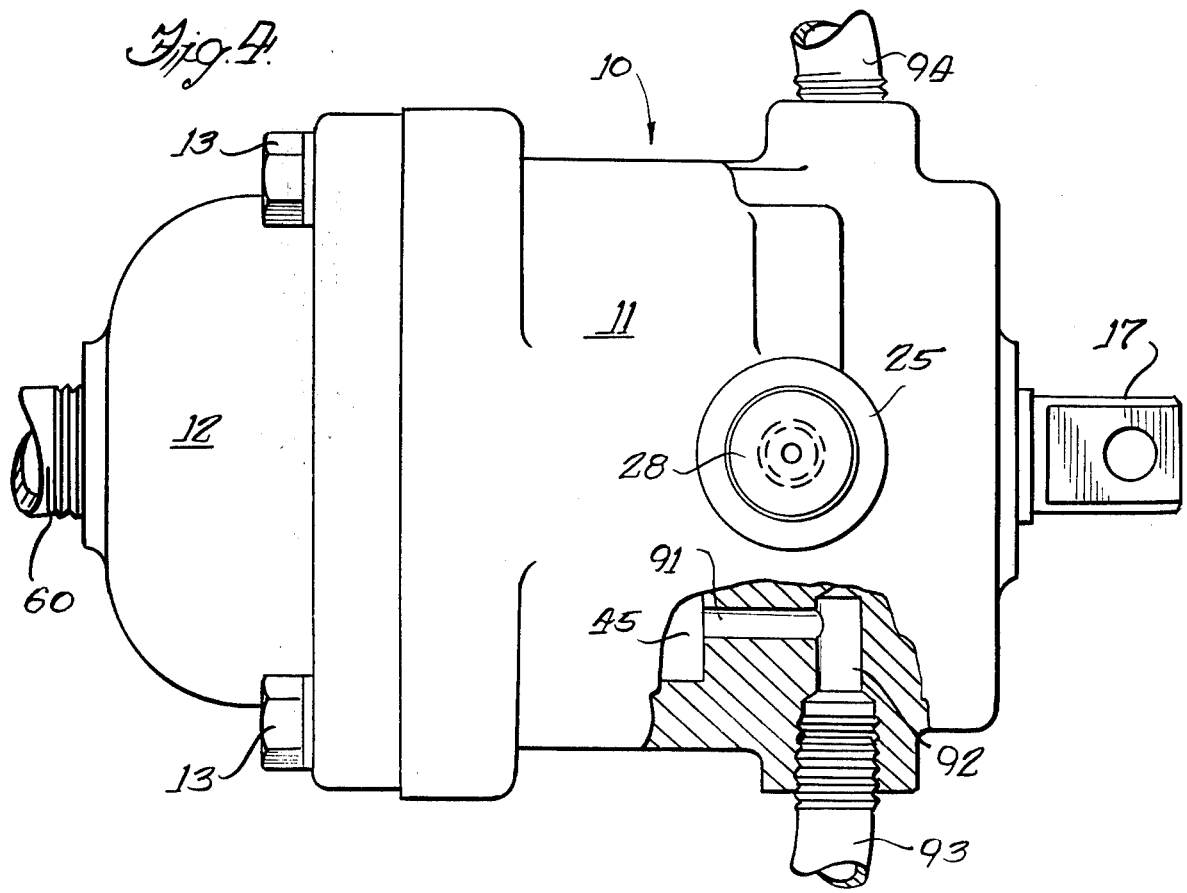
FIG. 4 is a top plan view similar to FIG. 1 but showing a modified embodiment of the invention, parts again being broken away to show in further detail the arrangement of the valve.
Figure 5:
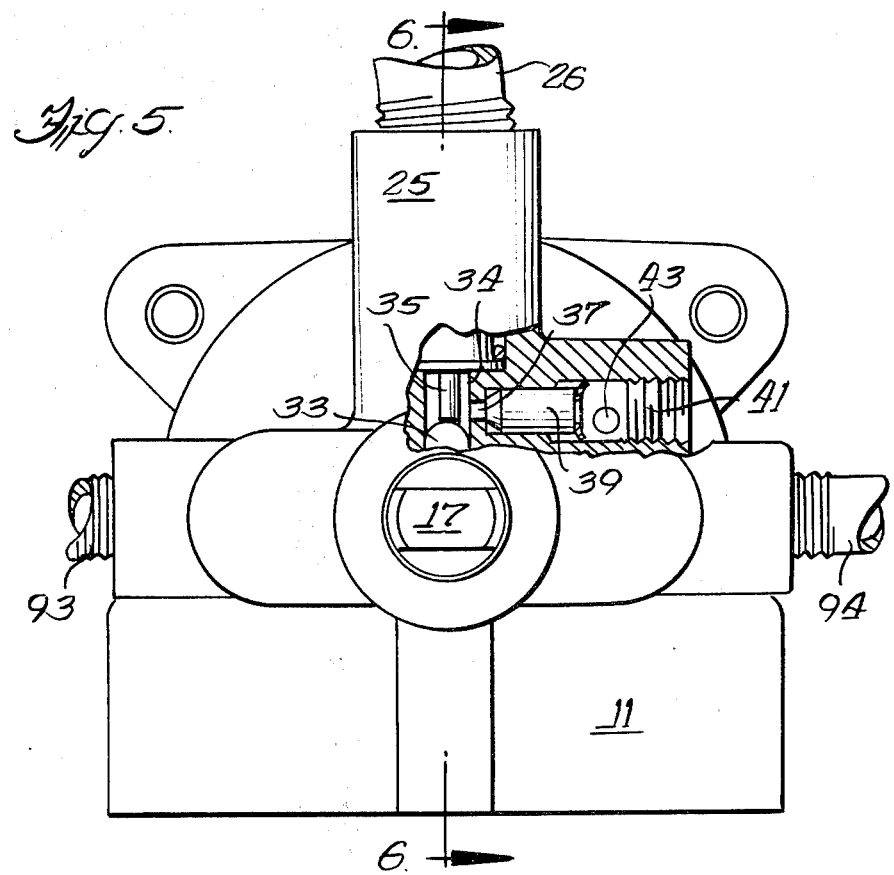
FIG. 5 is an end elevational view similar to FIG. 2 showing the modified embodiment of the invention, and again having portions of the valve housing broken away to show the internal arrangement of valve parts.

If a single brake element is to be actuated or nondifferential braking is desired, this fluid discharge can occur through intersecting bores 91 and 92 for delivery to an outlet port 93 and subsequent transfer to the brake element. The effects of fluid discharge restrictions can be minimized by providing a like series of bores and a discharge port 94 on an opposite side of the valve as shown in FIG. 4.

When differential braking action is desired, a stop valve mechanism 100 can be installed at the intersection point 101 of these two bores 91 and 92, as shown more particularly in FIG. 1. This flow stop mechanism 100 here includes a body 104 carried in a plug 105 to permit the stop mechanism assembly to be easily and quickly installed in the valve 10. The collar 106 prevents excessive body 104 withdrawal motion (to the right as shown in FIG. 1). An actuator pin portion 107 carries an O-ring seal 108 to prevent fluid leakage around the stop member parts.

In accordance with yet another aspect of the invention, gradual stop-member opening action is provided, and, as the stop member is returned to the closed position shown in FIG. 1, pin centering action occurs. To this end, the pin 107 is provided at its head end with a conical configuration 110. Between a point 111 and a cone base 112, this conical surface 110 intersects a seat 114 to inhibit fluid flow or pressure transfer out the left and right fluid brake ports 120 and 121, respectively. In this way, a precise opening and closing brake port valve action provides a smooth, gradual, precise brake "feel" to the operator as he applies and then adjusts braking action to his vehicle. It will be understood that similar structure is provided for the right hand brake port 121.

To actuate and deactuate these stop members 104, links 125 and 126 are pivotally secured to the end 17 of the brake rod 16, as by a pivot pin 128. Pivot pins 129 and 130 connect the links 125 and 126 to connector portions 132 and 133 of the stop member pins. It will be understood that, as the rod end 17 is drawn out (to the right, as shown in FIG. 1), and if the links 125 and 126 are rotated in a counter-clockwise direction, the stop pin 104 will be pushed to the right, by the pin 107 due to pressure in the chamber 45 thereby withdrawing the cone 110 from its annular seat 114 and permitting fluid flow from the chamber 45 along the passages 91 and 92 toward the brake port 120. Conversely, brake link pivoting motion in a clockwise direction will force the pin 104 into its seated illustrated position, thereby prohibiting brake fluid flow out the brake port 120. Brake rod withdrawal without link rotation will permit both ports 120 and 121 to be opened so as to permit brake fluid flow to both left and right hand portions of the braking system.

From the foregoing, it will be understood that should system portions located upstream of the valve 10 fail to deliver requisite fluid flow or fluid pressure to the valve 10, the valve 10 will, nevertheless, automatically operate in a fail-safe manual mode to deliver fluid flow and pressure to downstream portions of the braking system, and consequently actuate the brakes in a safe manner. As the valve rod 16 is continually drawn from the valve 10 (to the right, as shown in FIGS. 1, 3, 4, 6) the reaction piston 55 first engages and draws the annular piston 50 to the right. As this piston motion occurs, the chamber 45 is collapsed in its effective volume, and fluid contained within the chamber is forced out of the valve through the brake ports 93, 94 or 120, 121 as described above.

It will also be understood from the foregoing, and from reference to FIG. 7, that the pistons 50 and 55 (having the beveled surfaces 66 and 70) and flow stop mechanisms 100 (installed at the bore intersections 101) can be provided in the same valve, in accordance with the invention.

The invention is claimed as follows:

1. A brake valve comprising a housing defining an elongated bore closed at one end by a fixed end wall, a bi-ended valve rod extending through the housing end wall and having a first end outside the housing and a second end inside the housing, an apertured piston slidably disposed within the bore, the piston aperture defining a flow space permitting fluid to flow through the apertured piston, the housing further defining an exhaust port permitting fluid which has moved past the apertured piston to flow out of the valve, a reaction piston carried on the second rod end and radially extending to cover the annular piston flow space, and being adapted to move toward the annular piston so as to halt the flow of fluid through the annular piston and create a movable end wall, the movable end wall, fixed end wall and bore thus defining at least in part a collapsible chamber in the valve, the improvement comprising an interior beveled surface in the annular piston taking the form of a truncated cone and having a large diameter on the annular face adjacent the reaction piston, the beveled surface tapering smoothly to a small diameter located at a point axially upstream of the face, and a mating exterior beveled surface formed on the reaction piston, the mating face tapering smoothly from a small diameter on the reaction piston face adjacent the annular piston to a large diameter located at a point axially downstream of that face, to provide a mutual centering and seating action to the annular piston and reaction piston as the reaction piston is moved toward the annular piston, at least one fluid flow path extending from the collapsible chamber to a brake outlet port defined upon the housing, the fluid flow being angled to change the direction of fluid flow therealong, and a fluid flow stop member including a conical head member located at the fluid flow path angle and being slidable in an upstream direction to engage an annular fluid flow seat at a point upon the stop member located between the conical head member base and a conical head member tip, the fluid flow stop member being slidable in a downstream direction out of engagement with the annular seat to permit fluid flow along the fluid flow path from the chamber to a downstream brake outlet port.

2. In a valve according to claim 1, the further improvement including resilient means carried between the reaction piston and the interior rod end for resiliently urging the reaction piston into engagement with the annular piston, and for inhibiting mechanical shocks from being transmitted from the valve rod to the reaction piston.

3. A valve according to claim 2 wherein said resilient means includes at least one Belleville washer element.

4. A brake valve according to claim 2 wherein said resilient means includes a plurality of Belleville washer elements.

5. A brake valve according to claim 4 wherein at least one Belleville washer element is stacked upon the rod in opposed relationship to at least one adjacent Belleville washer element.

6. A brake valve according to claim 5 including spacer ring elements carried on the rod at positions located between adjacent opposed Belleville washer elements so as to prevent the rod from compressing the Belleville washer elements so seriously as to overstress the Belleville spring washers and consequently result in premature failures.

7. A brake valve according to claim 1 including a plurality of said angled fluid flow paths and a corresponding plurality of fluid flow stop members.

8. A brake valve according to claim 1 including at least one valve rod link mounted upon said outer valve rod end, the valve rod link carrying a plurality of stop member actuators, the stop member actuators being located for at least intermittent engagement with a corresponding fluid flow stop member upon appropriate rotation of the valve rod link.

* * * * *